United States Patent

Bejeannin

[11] 4,009,905
[45] Mar. 1, 1977

[54] SAFETY BELT ACCESSORY

[76] Inventor: Désiré Jean-Marie Bejeannin, 12, rue Gai Sejour, Longchaumois - Jura, France

[22] Filed: Oct. 29, 1975

[21] Appl. No.: 626,874

[30] Foreign Application Priority Data

Oct. 30, 1974 France .................. 74.40157
Aug. 11, 1975 France .................. 75.25584

[52] U.S. Cl. .................. 297/385; 24/201 R; 244/122 B; 244/151 R
[51] Int. Cl.² .................. A62B 35/00
[58] Field of Search .......... 280/150 SB; 297/385, 297/384, 386, 389, 388; 244/122 R, 122 B, 151 B, 151 R; 24/201 R, 164; 30/272 R, 162

[56] References Cited

UNITED STATES PATENTS

| 2,569,080 | 9/1951 | Trimble et al. .................. 30/162 X |
| 2,750,644 | 6/1956 | Martin et al. .................. 244/122 B |
| 3,142,102 | 7/1964 | Saunders .................. 297/385 X |
| 3,484,940 | 12/1969 | Zell, Jr. .................. 30/162 |
| 3,840,988 | 10/1974 | Hoffman .................. 244/151 B |
| 3,872,591 | 3/1975 | Quenot .................. 30/162 |

*Primary Examiner*—James T. McCall
*Attorney, Agent, or Firm*—Karl F. Ross; Herbert Dubno

[57] ABSTRACT

A safety belt is provided with an accessory that can be actuated in emergency situations to sever the belt and allow the belt user to be freed from the belt. This accessory has a pair of parallel blades one of which may be pulled along the other to sever the belt scissor-fashion when a force exceeding a predetermined minimum force is exerted on the blade pull. The movable blade may be spring-loaded so that simple actuation of a pushbutton or withdrawal of an operating pin allows the springs to push the movable blade across the fixed blade and sever the belt. Such an accessory is mounted on the seat belt in the middle of the chest of the user to make it readily accessible to the user or a rescuer in an emergency situation.

11 Claims, 11 Drawing Figures

U.S. Patent  Mar. 1, 1977  Sheet 1 of 2  4,009,905
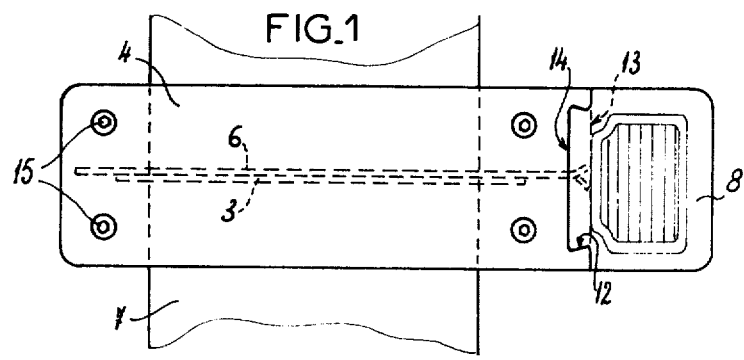
FIG.1
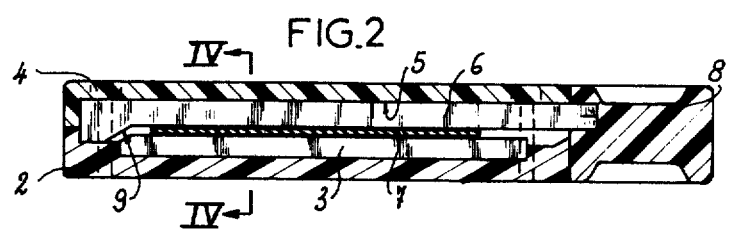
FIG.2
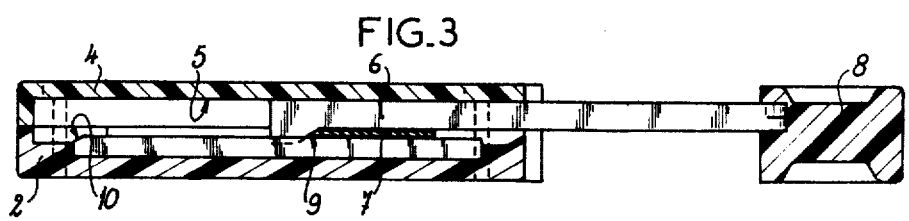
FIG.3
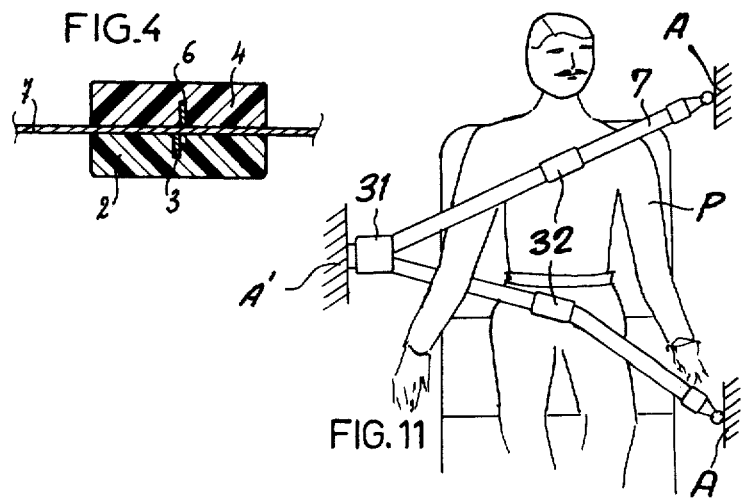
FIG.4
FIG.11

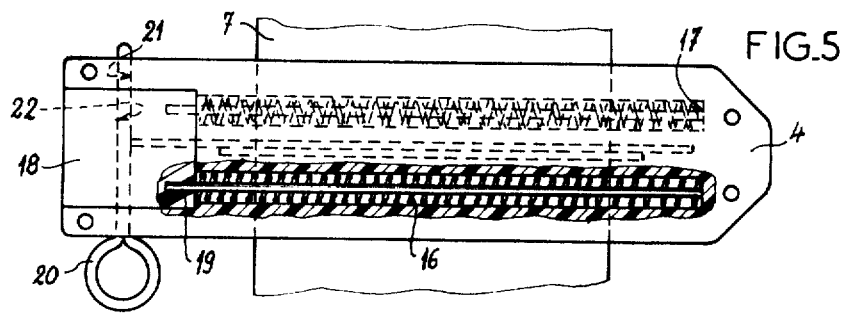
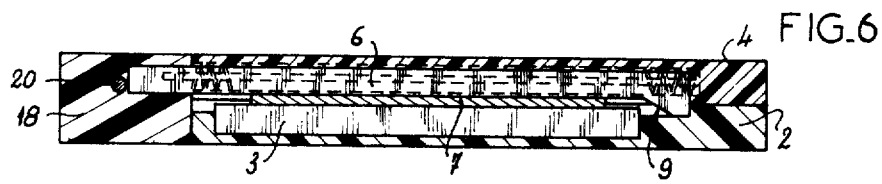
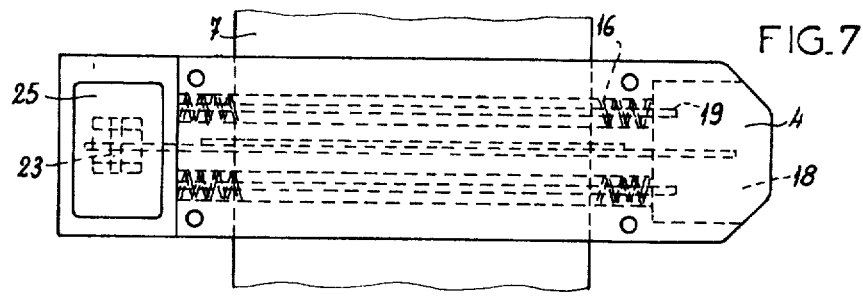
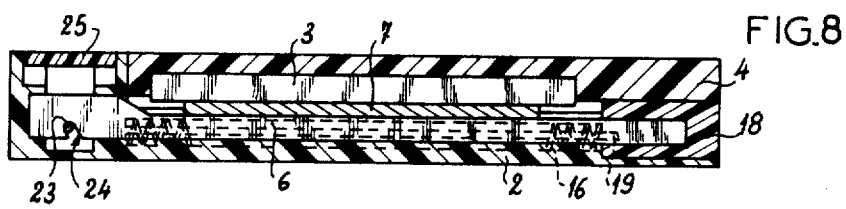
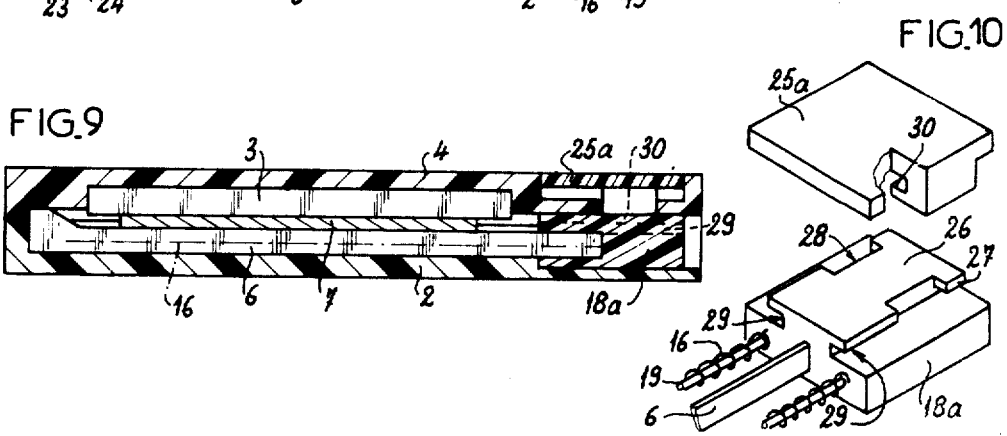

SAFETY BELT ACCESSORY

FIELD OF THE INVENTION

The present invention relates to a motor-vehicle seat belt. More particularly this invention concerns a safety apparatus usable in conjunction with such a seat belt.

BACKGROUND OF THE INVENTION

An automotive safety seat belt comprises a textile belt spanned between an anchor and a buckle assembly and over a person seated in the motor vehicle. In combined shoulder and lap belts the belt is spanned from an overhead anchor across the person's chest to the buckle, and also from a floor anchor over his or her lap to the same buckle assembly. The function of such safety belts is to prevent a person from being thrown forwardly in the event of a collision. The life-saving potential of such devices is enormous and has in fact been recognized to the extent that such safety belts are now required by law.

The principal objection to safety belts is, however, that after a collision or the like the safety-belt user might be trapped by the belt. In fact it has happened that a severe accident has made the buckle inoperative or inaccessible so that it becomes a very difficult operation to remove the user from the vehicle. The possibility of fire after an accident makes it imperative that the user be quickly freed from the constraining safety belt. Cutting the belt requires the user or the rescuer to have a good cutting instrument to sever the typically strong textile belt, and even then the user is exposed to the danger of being injured by such cutting instruments.

OBJECTS OF THE INVENTION

It is therefore an object of the present invention to provide an improved safety seat belt arrangement.

Another object is the provision of a safety apparatus which makes it possible to free a safety-belt user quickly and easily even when the safety-belt buckle assembly is inoperative or inaccessible.

SUMMARY OF THE INVENTION

These objects are attained according to the present invention in a safety apparatus having a housing securable to the seat belt between the buckle assembly and anchor thereof and provided with at least one blade and means for displacing this blade across the seat belt when actuated with a force exceeding a predetermined minimum force. Thus it is possible for the user or a rescuer to actuate and sever the belt in order to free the user from it. The housing is in accordance with this invention secured to the belt in the region of the user's chest for a shoulder-type belt and/or in the region of the user's lap for a lap belt so that the cutting arrangement remains accessible even when the buckle is not.

In accordance with further features of this invention the housing is split and has one half which serves to house a fixed blade whose cutting edge is turned toward the other housing half which is itself fitted with a slideway or guide serving to house a movable blade which is longer than the fixed blade and offset laterally relative thereto so that a space is left for the passage of the belt between the cutting edges of the two blades. On the side nearest the closed end of the casing formed by the two halves of the split housing this second blade has a cutting edge which is inclined from the open end of the casing towards its closed end, and from the housing half which bears this blade toward the other housing half. The tip of this cutting edge is situated between the level of the cutting edge of the first blade and the bottom of its housing.

In this way, under normal conditions of use, the belt passes between the two blades which have absolutely no adverse effect on the effectiveness of the belt. Should it be impossible to operate the buckle of the safety belt, the user need only displace the movable blade relative to the fixed blade. By means of its sloping edge, the wide section of the movable blade presses on the belt, and cuts it.

The means for displacing the movable blade relative to the fixed blade consists either of a handle which is fixed relative to the movable blade and projects at least partially from the casing, or by elastic components normally kept compressed and associated with a locking device for the movable blade in the retracted position.

BRIEF DESCRIPTION OF THE DRAWING

The above and other objects, features, and advantages of the invention will become more readily apparent from the following description, reference being made to the accompanying drawing in which:

FIG. 1 is a front view of a first embodiment of the safety-belt attachment according to the present invention;

FIGS. 2 and 3 are longitudinal sectional views through the attachment in FIG. 1, in the normal position and in operation, respectively;

FIG. 4 is a section taken along line IV — IV of FIG. 2;

FIG. 5 is a front view, partly in section, of a second embodiment of this attachment;

FIG. 6 is a view in longitudinal section through the attachment of FIG. 5;

FIGS. 7 and 8 are front and sectional views, respectively, of another attachment.

FIG. 9 is a longitudinal section through a modified version of the attachment in FIG. 7;

FIG. 10 is a perspective view of a detail of the locking means for the movable blade of the attachment of FIG. 9; and FIG. 11 is a perspective view illustrating the apparatus according to this invention in use.

SPECIFIC DESCRIPTION

The attachment according to the invention comprises a casing consisting of two housing halves 2 and 3 of which one half 2 serves to house a fixed blade 3 and the other half 4 is equipped with a slideway as guide 5 serving to house a blade 6 lying in a plane parallel to that of the blade 3 and offset in relation to this blade 3 so that a space is left for the belt 7 to pass through between the cutting edges of the two blades 3 and 6. The length of the movable blade 6 is greater than the length of the fixed blade 3.

In the construction form shown in FIGS. 1 to 4, one of the ends of the movable blade 6 is anchored in a handle 8 external to the casing, and its other end is widened to give a cutting edge 9 sloping from the handle 8 toward the free end of the blade 6 and from the housing half 2 toward the housing half 4. The end of the cutting edge 9 is located between the cutting edge of the blade 3 and the bottom of its housing.

Further, the fixed blade 3 has a cutting edge of which the section 10 lying near to the free end of the movable blade 6 slopes from the side of the casing fitted with the handle 8 toward the opposite side, and from the passage for the safety belt toward the bottom of the housing of the blade 3.

With the belt 7 in normal use, a dovetailed part of the handle 8 is engaged in a dovetail recess 12 formed in the casing. This recess is such that the section of its opening 13 is less than the section of the edge 14 of the handle 8. In this way, the displacement of the movable blade cannot be effected except after disengaging the handle from the recess 12, which requires a relatively strong pull to make the edge 14 pass through the opening 13. This passing through is made possible by the deformation qualities of the material from which the attachment is made, which may for example be synthetic-resin material.

The two halves 2 and 4 are assembled with the aid of four screws 15, thus allowing the attachment to be fitted onto the belt without having to take the belt assembly apart.

FIGS. 5 to 10 show construction variations of this attachment in which the control of the movable blade 6 is carried out by elastic means with a locking device.

This elastic means consists of two helical springs 16 disposed longitudinally inside the casing, on either side of the movable blade 6. These springs press at one end on the end 17 of the casing and on the other end on the blade support 18 situated at its ejection side. Guide rods 19, integral with the support 18, are provided for the springs 16. In the construction form shown in FIGS. 5 ad 6, the movable blade is locked in the casing by means of a keeper pin 20 which traverses both the coaxial bores 21 formed in the casing and a bore 22 formed in the support 18.

In the position shown in FIGS. 5 and 6, the keeper pin 20 prevents displacement of the movable blade relative to the casing. When the user pulls the keeper pin 20 completely out of the casing, the movable blade will be freed and cuts the belt as it is pushed thereacross by the springs 16.

In the construction form shown in FIGS. 7 and 8, the movable blade is locked by means of a pin 23 engaged normally in a slot 24 formed in the inoperative end section of the blade 6 opposite the ejection end. This pin 23 is actuated by means of a push-button 25, exposed on one of the faces of the casing.

When the user degresses the button 25, the pin 23 carried on it is also displaced and disengages from the blade 6. This blade is thus freed to move rapidly under the influence of the springs 16.

In the construction form shown in FIGS. 9 and 10, the locking means for the blade consists of an integral part of a push-button 25a which operates with the support 18a of the blade. To this effect the support 18a has at its center a longitudinal projection 26 of approximately parallelepipedal form and defined by return bends 27 which are parallel to the plane of the support on which it is formed, and which each have a cutout 28 in one of their longitudinal edges.

Each return bend 27 defines a guide or slideway 29 with its surface facing the support. The integral part of the push-button has lugs whose shapes are complementary to the cutouts 28. At normal times, the lugs 30 are engaged in the cutouts 28, and prevent the movable blade 6 from moving.

In case of emergency, the user depresses the button 25a. This causes the lugs 30 to escape from the corresponding cutouts 28 and they each enter into a slideway 29, thus allowing the blade 6 to slide. Obviously, the thickness of each lug 30 30 is less than the distance between the actual support part and the return bends 27.

FIG. 11 shows how the belt 7 is spanned over a passenger P and between two terminal anchors A. At its center the belt 7 carries a buckle assembly 31 securable in another anchor A'. One emergency-severing unit 32 is provided substantially in the middle of the passenger's chest and another in his lap, so that in case of emergency these units can be actuated to cut the belt 7 and free the passenger. It is noted that the devices 32 are of light construction and are not bulky so they do not constitute an annoyance or hindrance to the user.

I claim:

1. In combination with an automotive seat belt, an apparatus comprising:
   a housing securable to said seat belt,
   at least one elongated blade displaceable in said housing across said seat belt, said blade reaching across said belt along one side thereof,
   means having a displaceable actuating element and connected to said blade at one end thereof for drawing same completely across said belt on actuation of said element with a force exceeding a predetermined minimum level, said blade having at the opposite end thereof a cutting edge inclined to said belt and positioned to slice through the same when said blade is drawn across said belt.

2. The combination defined in claim 1 wherein said seat belt has a buckle and an anchor, said belt passing between said buckle and said anchor and being provided therebetween with said housing.

3. In combination with an automotive seat belt, an apparatus comprising:
   a housing securable to said seat belt,
   at least one blade displaceable in said housing across said seat belt,
   means having a displaceable actuating element and connected to said blade for drawing same completely across said belt on actuation of said element with a force exceeding a predetermined minimum level, said seat belt having a buckle and an anchor, said belt passing between said buckle and said anchor and being provided therebetween with said housing, and
   another such blade fixed in said housing, said one blade being movable in said housing across the fixed blade and said belt normally passing between said blades, whereby displacement of the movable blade across the fixed blade severs said belt.

4. The combination defined in claim 3 wherein said movable blade has a cutting edge lying at an angle to said fixed blade, said movable blade being slidable along said fixed blade with said cutting edge across said fixed blade.

5. The combination defined in claim 4 wherein said movable blade is provided with a holding element displaceable away from said housing to slide said movable blade across said fixed blade.

6. The combination defined in claim 5, further comprising at least one spring braced between said housing and said holding element and urging said holding element away from said housing, and lock means normally retaining said holding element on said housing and actuatable to allow said spring to push said element away from said housing and thereby to slide said movable blade across said movable blade across said fixed blade and sever said belt.

7. The combination defined in claim 6 wherein said lock means includes a pushbutton on said housing carrying a detent operatively engageable with said movable blade and displaceable between a first position securing said movable blade from moving within said housing and a second position allowing said spring to push said movable blade across said fixed blade.

8. The combination defined in claim 7 wherein said detent is a pin carried on said pushbutton and extending transverse to and across said movable blade, said movable blade being formed with a laterally open notch normally receiving said pin.

9. The combination defined in claim 7 wherein said detent is a lug carried on said pushbutton and said holding element is formed with a guide extending in line with the displacement direction of said holding element relative to said housing and with a notch opening into said guide and normally receiving said lug, said pushbutton being displaceable between a position with said lug engaged in said notch and preventing displacement of said element relative to said housing and a position with said lug in said guide and permitting sliding of said element relative to said housing.

10. The combination defined in claim 3 wherein said housing is carried on said belt at a location corresponding substantially to the chest region of a user of said belt.

11. An attachment for a safety belt comprising:
- an elongated rectangular-section housing formed at its opposite longitudinal sides with a pair of slots adapted to pass a safety belt traversing said housing;
- an elongated movable blade member extending longitudinally in said housing adapted to lie along a surface of and across said belt, said movable blade member having at one end a cutting edge normally disposed at one edge of said belt and inclined thereto for slitting said belt from side to side,
- a holding element fixed to said blade member at the other end thereof; and
- a detent on said housing retaining said edge in its normal position laterally spaced from said belt and releasable to permit relative longitudinal movement of said element and said housing whereby said element can be gripped to draw said cutting edge across the belt.

* * * * *